United States Patent [19]

Hill

[11] 4,387,020

[45] Jun. 7, 1983

[54] FLOW CONTROL APPARATUS

[75] Inventor: Robert C. Hill, Santa Clara, Calif.

[73] Assignee: Atlantic Richfield Company, Los Angeles, Calif.

[21] Appl. No.: 336,661

[22] Filed: Jan. 4, 1982

[51] Int. Cl.³ .............................................. B01D 21/24
[52] U.S. Cl. ...................................... 210/86; 210/137; 210/188; 210/256; 210/921
[58] Field of Search .................. 210/86, 101, 137, 188, 210/256, 258, 921

[56] References Cited

U.S. PATENT DOCUMENTS

| | | | |
|---|---|---|---|
| 838,535 | 12/1906 | Greer | 210/101 |
| 3,193,989 | 7/1965 | Sebeste | 210/188 X |
| 3,951,788 | 4/1976 | Ward et al. | 210/921 X |
| 4,303,527 | 12/1981 | Reimann et al. | 210/921 X |

Primary Examiner—John Adee
Attorney, Agent, or Firm—Robert M. Betz

[57] ABSTRACT

A flow control apparatus is described for inclusion in a waste water treatment system intermediate a surge tank and a first active processing stage such as a biological treatment tank employing a trickling filter. The apparatus consists of a form of "head box" which smooths out the variations in the output of the surge tank. The apparatus consists basically of one tank enclosed within another. Water from the surge tank fills the inner tank and spills over its flat rim to form an efficient head control weir. The inner tank is provided with a submerged orifice which acts as a flow control weir discharging freely into the air space above the free water surface of the succeeding processing stage. The top of the outer tank is closed and sealed to isolate the intense air pressure, which is vented through the inner tank to the air in the succeeding stage. This insures that no differential pressure exists between these two internal air spaces and that no contamination of the external environment occurs. The outer tank accumulates the overflow from the inner tank and returns it through a U-trap to the surge tank.

8 Claims, 4 Drawing Figures

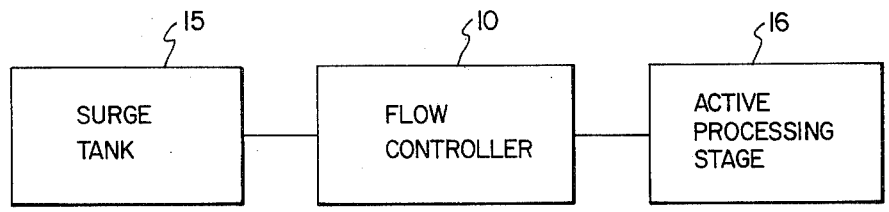
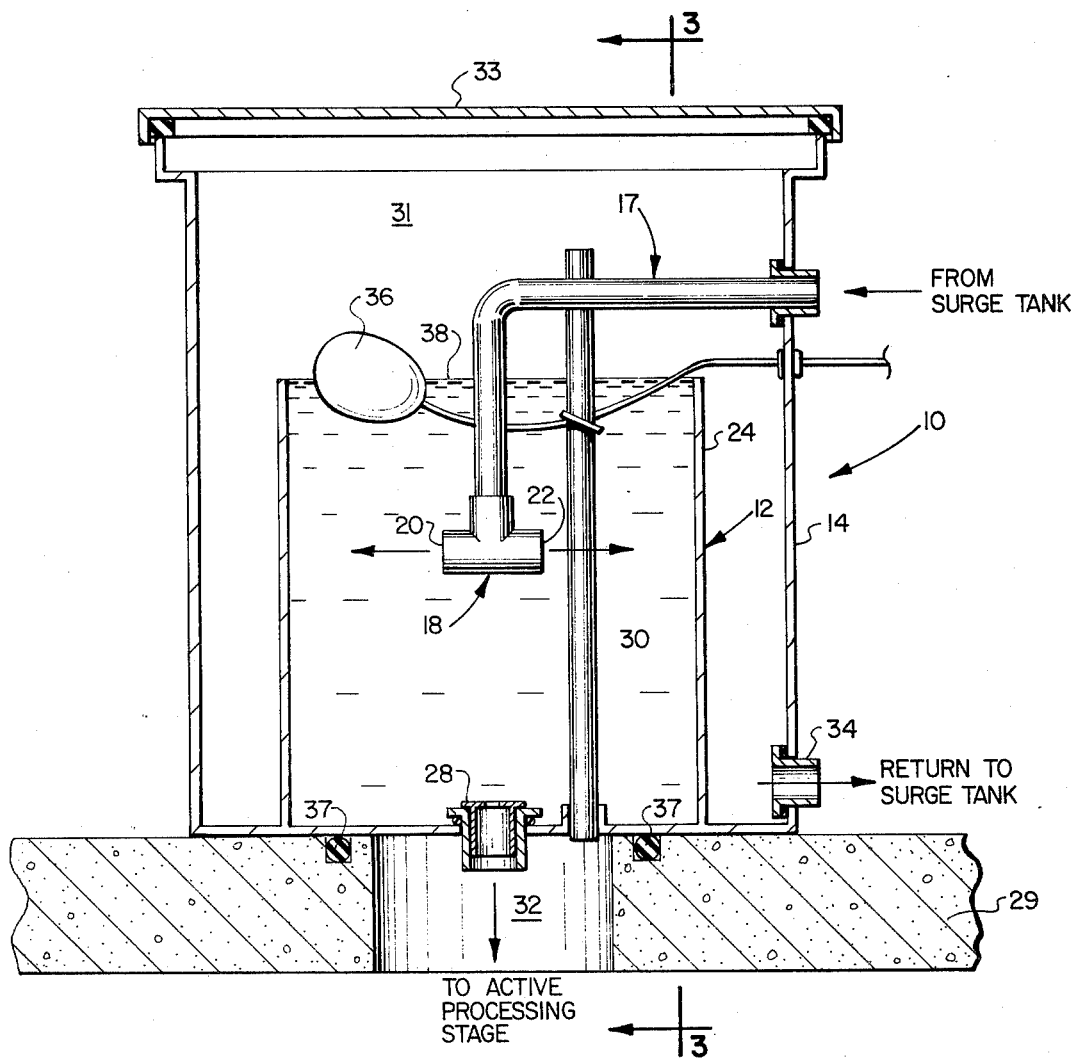

FLOW CONTROL APPARATUS

BACKGROUND OF THE INVENTION

I. Field of the Invention

This invention relates generally to the control of fluid flow and more particularly to a liquid flow control apparatus for inclusion in a wastewater treatment system.

II. Description of the Prior Art

There is a need to regulate fluid flow which is common in many industries and is of particular importance in the sewage treatment business. This is because of the presence of large fluid flows and changes in flow at the inlet to sewage processing systems. Sewage treatment plants are designed to operate most efficiently under constant flow conditions. The size and cost of a treatment plant is a function of the maximum flow rate. In biological treatment systems employing trickling filters the amount of plastic media required for bacteria to grow on and digest the contaminants in the wastewater is related to the rate of flow. There are a family of devices in the prior art whose purpose is to provide a reasonably constant outflow of water from a source of water whose flow rate varies.

One such device, a surge tank or flow equalization tank, is provided upstream of the active sewage processing stages in order to accumulate influent liquid. Liquid is pumped continuously from the surge tank to these active stages. The flow rate downstream from the pump is designed to be reasonably constant so that one can run the plant up to its full capacity for maximum utilization of its potential.

In order to accommodate long term changes in flow, one designs the processing plant to handle the projected peak daily total flow. When the upstream surge tank goes empty, the flow through the plant is shut off. Internal process stages such as trickling filters supply pumps will normally remain inoperative to maintain the biota in a viable state.

The flow rate of a typical surge tank pump of the open impeller centrifugal type is strongly dependent upon the total dynamic head, which varies depending upon whether the surge tank is empty or full. The flow rate of such a pump varies by such a factor of up to four to one, depending upon the selection of the pump and the depth of the surge tank. In order to supply influent at a substantially constant rate to a processing plant, it is therefore necessary to smooth out the variations in the surge pump rate, hopefully bringing such variation down to plus or minus a few percent. Especially in small plants, it is very important to achieve this result without benefit of complex instrumentations or operator attention and at the same time keep manufacturing costs low and maintain high reliability.

A further benefit of accurate flow control is the ability to eliminate a second device used to monitor plant throughput for record keeping purposes. This data is normally required for compliance with license requirements and for determination of plant operating costs. An accurate flow controller, coupled with a simple operating time recorder on the surge pumps, accomplishes the same result as the more expensive and generally less reliable flow monitoring device.

In the prior art, the flow control function has been achieved in several ways. These include installation of surge pumps of the constant displacement type; insertion of automatic control valves in the pipe output from the surge tank pump together with associated sensors and feedback circuits; and finally, the inclusion of apparatus commonly termed a "head box." A prior art three-stage "head box" includes first a stilling well fed from the surge tank. Typically, two pumps are employed with control means to operate them separately or simultaneously as required. Check valves are typically installed to permit use of a single input conduit and to prevent one pump from discharging back through the others. The stilling well is adapted to smooth out turbulence and pulsations in flow from the input pump. The output of the stilling well flows under a baffle into a second chamber for establishment of the upstream head for a flow control weir. This is done by means of a so-called head-control weir, typically an open standpipe which establishes the operating water level. Another weir, the flow-control weir, commonly a V-notch type, governs the flow from the second chamber into a third chamber which acts as a collection sump. The third chamber has sufficient dimensions to permit free discharge from the flow control weir.

It is a general objective of this invention to provide means for maintaining the rate of flow to an active waste treatment plant at a substantially constant figure with low cost and high reliability.

It is a more particular objective of this invention to improve the functions of a flow control apparatus or "head box" as described above in several respects. First, it is desirable to achieve optimum liquid stilling in order to eliminate turbulence and reduce the velocity of pump flow by dissipating fluid energy as quickly and uniformly as possible. Secondly, it is desirable to control the upstream head in the flow control apparatus as closely as possible over a wide range of rates of inflow, so as to satisfy the condition that the head upstream of the flow-control weir is constant. Finally, it is desirable to select a flow control weir which achieves substantially constant flow within the narrowest possible range given unavoidable variations in upstream head and turbulence.

III. Summary of the Invention

What is described is a flow-control apparatus adapted for inclusion in a wastewater treatment system intermediate a surge tank and the first active processing stage such as a biological treatment tank clarifier. The apparatus includes an inner tank, preferably circular, having a flat rim and an open top and an outer tank of larger diameter enclosing said inner tank and having a closed, sealed, top. A fluid inlet conduit for receiving liquid pumped from said surge tank is introduced into the inner tank from a height above its top. A flow distributor or splitter communicating with the inlet conduit comprises a plurality of interconnected ports opening into the inner tank which are adapted to divide the liquid stream from the inlet conduit into two or more streams and introduce them into the tank in opposing directions. A submerged orifice in the inner tank constitutes a flow control weir having a free discharge path into the atmosphere of the next succeeding processing stage. Pump means are provided for delivering liquid from the surge tank to the inner tank at a rate sufficient to overflow its rim into the outer tank, which in turn is provided with outlet means for returning the overflow to the input side of the pump. Finally, vent means are provided which interconnect the atmosphere in the second tank with the air space into which the flow control weir discharges, thus equalizing these pressures.

The cover on the outer tank is sealed and serves the dual function of isolating the pressure inside the tank from that on the outside, which is frequently different from that in the tank in which the flow control weir discharges, and secondly, of isolating the external environment from contamination.

IV. Brief Description of the Drawings

FIG. 1 is a block diagram illustrating the location of the flow control apparatus of this invention within a complete wastewater treatment system.

FIG. 2 is a detailed sectional view, partially diagramatic, of a flow control apparatus in accordance with the preferred embodiment of this invention.

V. Detailed Description of the Preferred Embodiments

Figure 3:
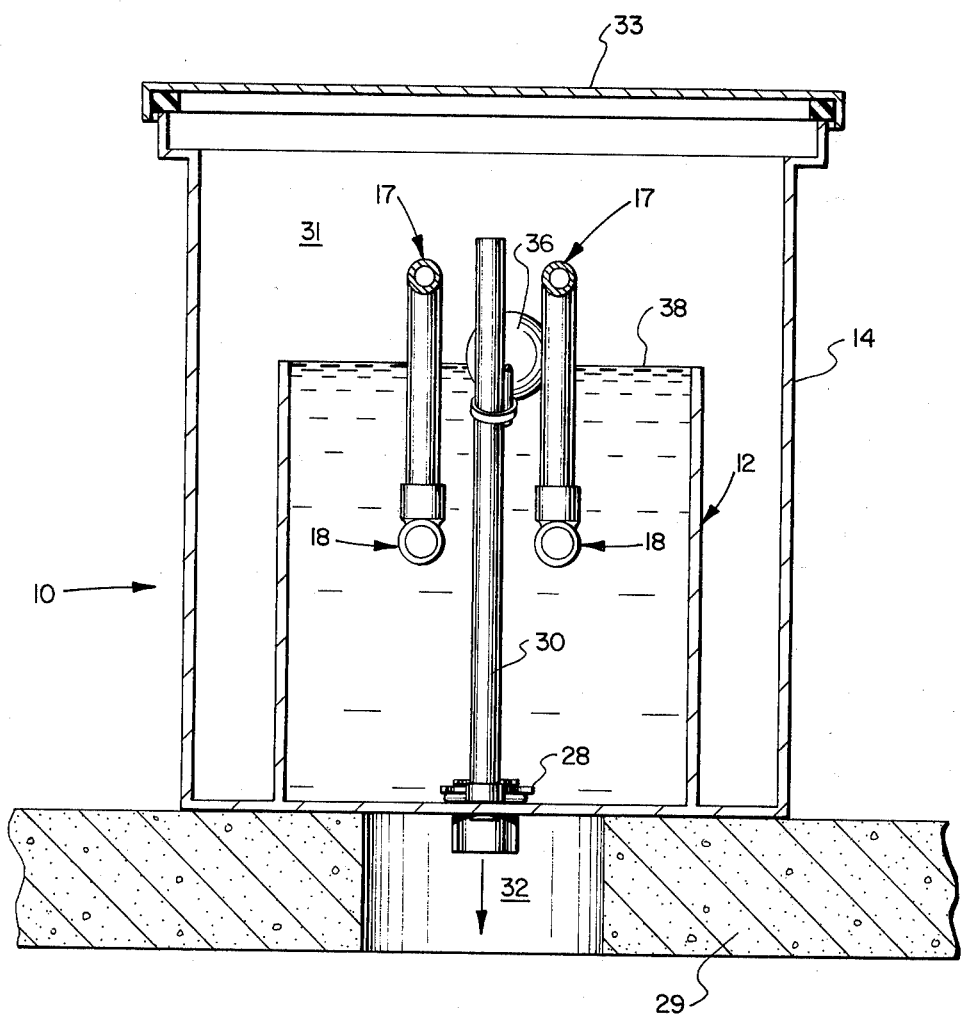
FIG. 3 is a detailed sectional view, partially diagrammatic, of the flow control apparatus of FIG. 2 rotates 90° to show the redundant input conduits.

With reference now to FIGS. 1, 2, and 3 there is illustrated a flow control apparatus 10 consisting generally of an open top inner tank 12 completely enclosed within a closed top outer tank 14. Typically tanks 12 and 14 are of concentric circular configurations. Apparatus 10 is adapted to receive waste water from surge tank 15 and deliver it at a constant rate to active processing stage 16 (FIG. 1). Either of inlet conduits 17 is adapted to receive wastewater influent from surge tank 15 and discharge such influent into tank 12 through respective multiport flow distributors 18. As shown either flow distributor 18 consists of a T-joint with two oppositely directed ports 20 and 22 designed to propel separate liquid streams in diametrically opposed directions against the sidewall 24 of tank 12. Clearly, any form of flow splitter adapted to accomplish this purpose may be substituted. An orifice plate 28 in the bottom of tank 12 establishes a flow control weir designed to freely discharge through concrete flooring 29 into the airspace 32 above the free water surface of any subsequent active water treatment stage such as a primary clarifier or biological digestion stage 16 (FIG. 1). Seals 37 isolate air space 32 from the external environment. Vent pipe 30 is seen to communicate between the airspace 31 in outer tank 14 and the free discharge environment 32 downstream of orifice plate 28. In operation, liquid fills tank 12 until it spills over the flat rim of wall 24 which therefore constitutes a head control weir of optimum configuration. The over flow from tank 12 is accumulated within tank 14 and returned through orifice 34 and a suitable U-trap (not shown) to the input side of a suitable surge tank pump (not shown). The function of the U-trap is to isolate the pressure within tank 14 from the pressure in the surge tank 15. By utilizing the sidewall perimeter of tank 12 as a flat topped weir, the optimum conditions are achieved for accommodating large changes in inflow in the smallest volume of container and yet producing a constant head. The use of orifice plate 28 as a flow control weir is also highly efficient in that the rate of change of flow through an orifice plate varies as the one-half power of change in upstream head. A further advantage of the submerged orifice is the ability to operate at substantially greater heads than are normally employed with notch-type weirs, thus further reducing sensitivity to changes in head. A third advantage of the submerged orifice is its much lower sensitivity to surface turbulence. By contrast, a V-notch weir experiences a rate of change of flow which varies as the 5/2 power of change in upstream head. In order to maintain a constant head for the output flow from tank 12, it is essential to equalize air pressure above and beneath the body of water in the tank. This is the function of vent pipe 30. At the same time sealed cover 33 on tank 14, usually held in place by negative pressure within tank 14, serves to isolate the gases and pressure differential of the internal atmospheres from the external.

A feature of this invention is that it eliminates the need for any complicated flow control monitor. The apparatus is a completely passive static device having no moving parts, no instrumentation, no special feedback elements, and requiring no human operator. In order to determine if the surge pumps are operating it is convenient to incorporate a simple mercury float switch 36 as shown in FIG. 2. If the surge pump is shut off, the orifice 28 drains tank 12 and the switch 36 provides an automatic indication of that shutdown. For the switch 36 to remain on, liquid must be coming into tank 12 at a sufficient rate to maintain it at a level very near the top of wall 24. It is a simple matter upon failure of such a sump pump to have a back up pump automatically brought into operation together with a sounding of an alarm.

As best seen in FIG. 3, input redundancy is provided by inclusion of parallel inlet conduits 16 and flow distributors 18 together with parallel surge tank pumps (not shown). When one pump is started the water level in the unused pump line rises only to the free water level 38 in tank 12, which is below the maximum elevation of conduit 16 going back to the unused pump. Thus, water never goes into the unused line to create a siphon effect. This totally eliminates the need for check valves in the event of shut off of one of two parallel pumps.

Figure 4:
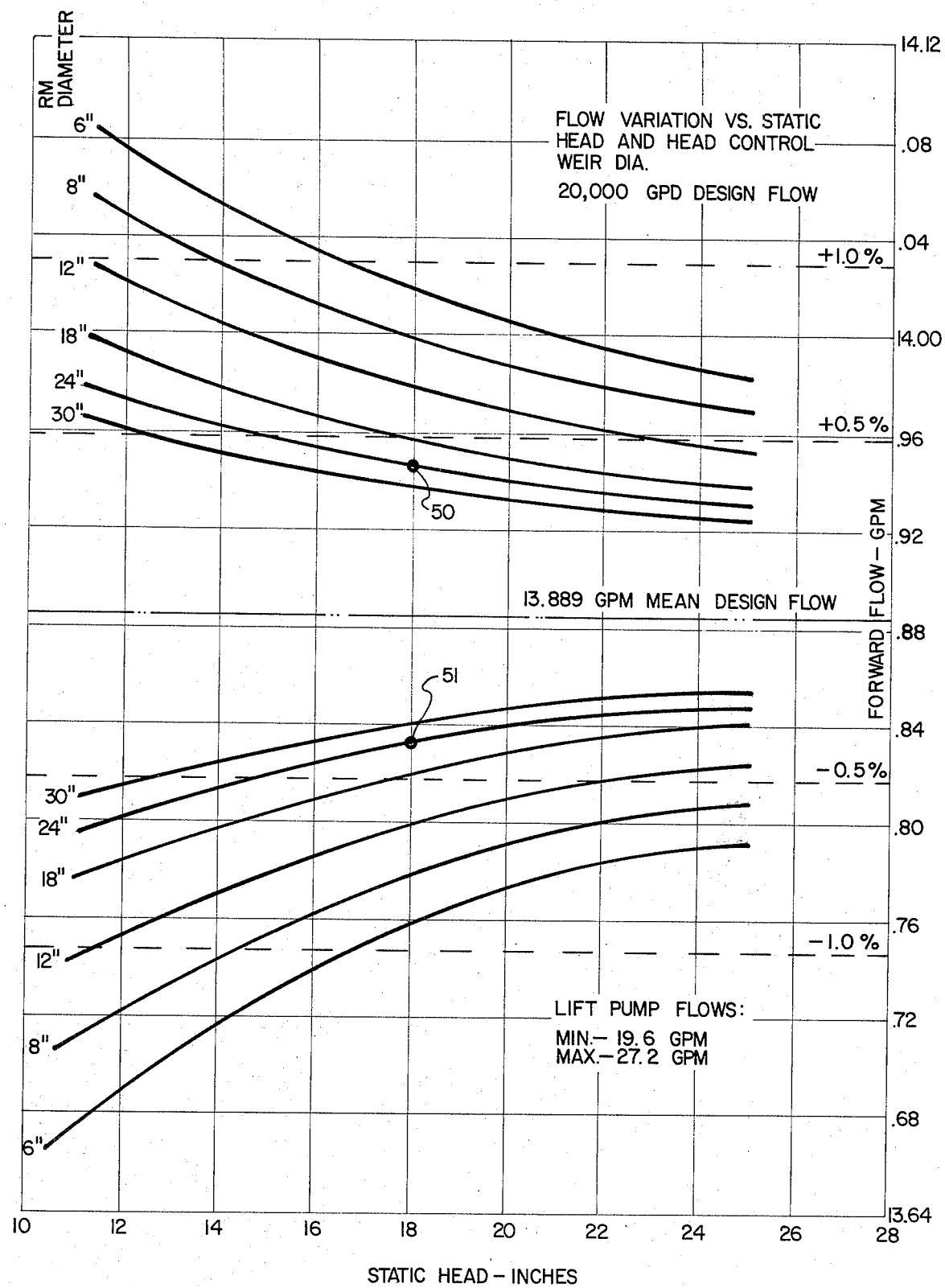
FIG. 4 is a family of curves showing typical design parameters of a flow control apparatus in accordance with the preferred embodiment of this invention.

To illustrate the degree of flow control achievable with the aid of the apparatus above described, the curves illustrated in FIG. 4 are helpful. The curves assume that a lift pump from surge tank 15 provides a flow of a minimum of 19.6 gpm and a maximum of 27.2 gpm. Assume, for example, that the rim diameter of wall 24 is 24 inches, that the depth of tank 12 is 18 inches, and that the mean design flow through orifice plate 28 is specified as 13.889 gallons per minute for orifice diameter of one inch for orifice plate 28. This flow is then calculated to vary between 13.945 and 13.832 gallons per minute as indicated by points 50 and 51 on the graph. This constitutes a total flow variation in both directions of less than 1%. The curves can also be used to determine the combination of static head and head control weir perimeter which will yield any assumed acceptable degree of variation in flow rate.

The particular embodiment of this invention as described is illustrative only and not intended to be limiting. Therefore many variations or modifications in the configuration and positioning of the components of the apparatus may occur to those skilled in the art without departing from the scope of the invention as set forth in the appended claims.

I claim:

1. In a waste water treatment system utilizing a surge tank and an active processing stage, an intermediate flow control apparatus comprising:

(a) an inner tank having a flat rimmed side wall and an open top;

(b) an outer tank surrounding said inner tank so that overflow from said inner tank freely discharges therein, said outer tank having a closed top;

(c) a fluid inlet conduit for receiving waste water from said surge tank to be delivered to said inner tank;

(d) a flow distributor communicating with said inlet conduit comprising a plurality of interconnected ports opening into said inner tank and adapted to divide the liquid stream from said inlet conduit into a like plurality of separate streams and introduce said streams into said inner tank in opposing directions;

(e) a first submerged orifice in said inner tank adapted to discharge into the air above a free water surface of said processing stage;

(f) vent means interconnecting the air space within said outer tank and the air space above said free water surface of said processing stage for equalizing the pressure therebetween;

(g) pump means for delivering waste water from said surge tank to said inner flow control tank at a rate sufficient to continuously overflow said sidewall; and (h) a second orifice in said outer tank adapted to return said over flow through a trap to the input side of said pump means.

2. A liquid flow control apparatus comprising:

(a) an inner tank having a sidewall of constant height and an open top;

(b) a first fluid inlet conduit adapted to deliver liquid from a source to within said inner tank, so as to overflow said side wall, the high point of said inlet conduit being positioned above the top of said tank;

(c) a first flow distributor interconnected with said inlet conduit within said tank for splitting said liquid into at least two diametrically opposed streams;

(d) a submerged orifice within said inner tank for controlling the liquid flow therefrom; and (e) means surrounding said inner tank for accumulating and returning said overflow to said source.

3. An apparatus as in claim 2 wherein said fluid outlet is adapted to freely discharge into an air space and wherein means are provided for equalizing the pressure between said free air space and the pressure of the air space above the water in said tank.

4. Apparatus as in claim 3 wherein said vent means is an open-ended pipe extending between said air spaces.

5. Apparatus as in claim 2 wherein said inner tank is surrounded by an outer accumulator tank so as to receive the overflow from said inner tank, said outer tank having an orifice therein adapted to return liquid accumulations to said source.

6. Apparatus as claim 5 wherein said outer accumulator tank has an enclosed top.

7. Apparatus as in claim 2 including a float switch responsive to a decrease in the liquid level in said inner tank below the top thereof, whereby an inoperative condition of said flow control apparatus is automatically signaled.

8. Apparatus as in claim 2 further including a second fluid inlet conduit combination with a second flow distributor in parallel with the first said inlet conduit and flow distributor, and similarly oriented, with respect to the top of said inner tank, thereby preventing liquid invasion of the second conduit in a reverse direction during utilization of the first such conduit.

* * * * *